FREQUENCY STANDARD RECEIVER

Filed July 21, 1958

FREQUENCY TABLE

| fo | fL | fv |
|---|---|---|
| 5.0 mc | 4.545 mc | 5.0 mc |
| 10.0 | 9.545 | 10.0 |
| 15.0 | 14.545 | 15.0 |
| 20.0 | 19.545 | 20.0 |

INVENTORS
RICHARD P. MATHISON
LLOYD J. DERR
BY Lyon & Lyon
ATTORNEYS

United States Patent Office 3,032,650 Patented May 1, 1962

3,032,650

FREQUENCY STANDARD RECEIVER

Richard P. Mathison, Altadena, and Lloyd J. Derr, La Crescenta, Calif., assignors to California Institute Research Foundation, Pasadena, Calif., a corporation of California Filed July 21, 1958, Ser. No. 749,783
7 Claims. (Cl. 250—6)

This invention relates to communication receivers and, more particularly, to improvements in receivers for providing signals which are employed as frequency standards.

As is well known, station WWV transmits signals which serve the purpose of providing standard reference frequencies to all persons who receive them. Because of the nature of the radio signals, there are a number of areas wherein the reception of the signals transmitted is not as good as is desired. Either the noise levels at those locations are such as to render reception substantially impossible, or because of atmospheric conditions fading is experienced, causing varying signal levels to be received, with consequent difficulty in maintaining the reference frequencies being derived from the receiver. Accordingly, receivers are being manufactured and sold for the purpose of receiving signals from WWV, which in order to overcome the difficulties mentioned, have a large number of expensive circuits for the purpose of increasing the sensitivity of the receiver to the best obtainable, as well as maximizing the signal-to-noise ratio of the signals.

It is an object of the present invention to provide an improved standard frequency receiver having greater sensitivity than those available heretofore.

It is a further object of the present invention to provide a useful standard frequency receiver which is simpler and more inexpensive to manufacture than those made heretofore.

It is yet another object of the present invention to provide a simple receiver which can provide a stability in its output equal to that of the received signal frequency.

Yet another object of the present invention is the provision of a receiver which has extreme sensitivity reception and which maintains constant a signal amplitude of its output despite the existence of adverse conditions during reception.

These and other objects of the invention are achieved by providing a receiver having a phase-locked loop which is connected to the receiver input in such a manner that a voltage-controlled oscillator which is in the phase-locked loop provides an output which is locked to the receiver radio frequency carrier.

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a circuit diagram of the embodiment of the invention.

Figures 1, 2:
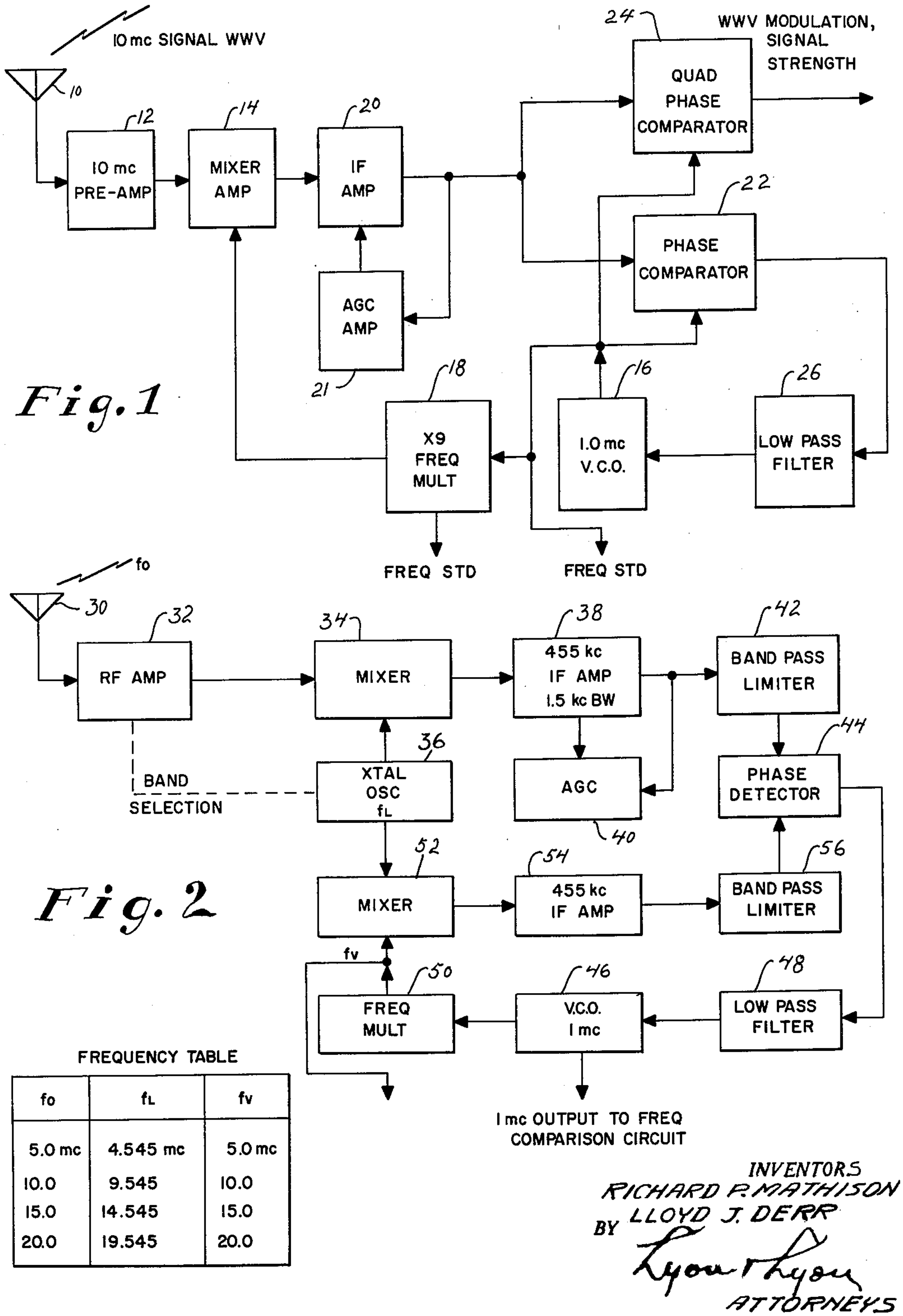
FIGURE 1 represents a block diagram of one embodiment of the invention.
FIGURE 2 represents a block diagram of an alternative embodiment of the invention.

In an application for Microlock, by John J. Burke, William F. Sampson and Eberhardt Rechtin, filed February 24, 1958, bearing Serial No. 717,061, which is assigned to a common assignee, there is described a communications receiver employing a phase-locked loop. In that receiver, incoming radio-frequency signals were mixed with the output of a voltage-controlled oscillator to provide an intermediate frequency. This intermediate frequency was further heterodyned to a lower intermediate frequency, which was then applied to a phase detector.

The other input to this phase detector was the output of a reference oscillator. The output of the phase detector, consisting of a control voltage, was then applied through a low-pass filter to the voltage-controlled oscillator to move it in a direction to minimize the value of the control voltage. This control voltage represented the difference in phase between the two signals being compared. The present invention differs over this receiver in excluding oscillators which may drift from the phase-locked loop or by employing such an oscillator in a manner to obviate the effects of any drift whereby the voltage-controlled oscillator in the phase-locked loop is varied only in response to any variations in the radio-frequency signal being received. As a result, the voltage-controlled oscillator is locked to the frequency of the radio-frequency signals being received.

Referring to FIGURE 1, there may be seen a block diagram of a preferred embodiment of the invention. This will include an antenna 10, which can receive the carrier of station WWV or WWVH. Assuming for the purposes of illustration that the 10 megacycle signal carrier signals on station WWV are desired to be received, the antenna is connected to a preamplifier circuit 12, which is tuned to the 10 megacycle frequency. The output of the preamplifier 12 is applied to a mixer amplifier 14. There is also applied to the mixer amplifier the output of a voltage-controlled oscillator 16 through a frequency multiplier 18. The voltage-controlled oscillator is a well-known type of oscillator, having a frequency which can be varied in response to the amplitude variations of a voltage which is applied to its input. A preferred embodiment of a voltage-controlled oscillator is described and claimed in an application for Voltage-Controlled Oscillator by Richard P. Mathison, Dean W. Slaughter, and Lee W. Randolph, filed February 24, 1958, bearing Serial No. 717,170, and assigned to a common assignee. The preferred center frequency for the voltage-controlled oscillator represented in FIGURE 1 is one megacycle. The preferred multiplication of the frequency multiplier 18 is a 9-times multiplication. The output of the mixer amplifier 14 is applied to an intermediate frequency amplifier 20, which can select a frequency of one megacycle from the two signals which are mixed. An automatic-gain-control amplifier 21 controls the gain of the intermediate-frequency amplifier 20 in a manner to maintain the amplitude of the output constant, despite variations in the input.

The output of the intermediate-frequency amplifier 20 is applied to a phase comparator 22 and a second quadrature phase comparator 24. The second inputs to the respective comparators 22 and 24 comprise the output of the voltage-controlled oscillator 16. The output of the phase comparator 22 comprises a control voltage having an amplitude representative of the difference in the phases of the two input signals. This output is applied through a low-pass filter 26 to the voltage-controlled oscillator to control its output in a manner to minimize the control voltage. If it is assumed at the outset that the voltage-controlled oscillator output frequency differs from that of the reference frequency provided by the received carrier signal, then the phase comparator can alter the voltage-controlled oscillator output in a manner to minimize or reduce to substantially zero such difference, whereby the phase comparator output voltage is minimized. It will be appreciated, therefore, that there is no oscillator employed in the receiver shown in FIGURE 1 which has a drift which can cause an erroneous output to be obtained from the receiver. The output of the voltage-controlled oscillator, once it has locked onto the receiver carrier frequency, is a signal which is suitable as a frequency standard at one megacycle. The output of the frequency multiplier may also be employed as a 9 megacycle reference frequency, since the frequency multiplier may be constructed from passive elements and as a result will not drift if due precautions are taken. The sensitivity of the receiver described is approximately —145 dbm, and the receiver provides a ten-cycles-per-second loop band-width at 10 megacycles or at any other frequency for which this receiver may be constructed. Obviously, the receiver may be altered to lock onto carrier signals at other frequencies by altering the tuning of the preamplifier, as well as the multiplication ratio of the frequency multiplier. These may be switched to tune to any of the other WWV transmitted frequencies.

The quadrature phase comparator 24 serves the purpose of detecting any modulation which is applied to the WWV carrier. Such modulation consists of a 600-cycle-per-second signal, a 440-cycle-per-second signal, a 1,000-cycle-per-second signal, and a one-second time signal.

It is desirable, in many instances, to build a receiver having standard intermediate-frequency frequency, since the intermediate-frequency amplifiers and associated filters are as shelf items. Furthermore, the mechanical filters at the 455-kilocycle frequency are commercially obtainable which provides many desirable results in a receiver of this type. Accordingly, FIGURE 2 represents a block diagram of a receiver employing the same principles as are set forth in FIGURE 1, namely, the use of a phase-locked loop for the purpose of increasing the sentitivity of the receiver, whereby it may stay locked on the reference carrier. The receiver has an antenna 30, which applies the reveived signals to a radio-frequency amplifier 32. The output of the radio-frequency amplifier 32 is applied to a mixture circuit 34. A crystal oscillator 36 provides oscillations which are heterodyned in the mixer with the signals received from the radio-frequency amplifier. The frequency of the crystal oscillator 36 is established in a value to provide a difference signal of 455-kilocycles. The output of the mixer is applied to a 455-kilocycle intermediate-frequency amplifier 38, which preferably has a bandwidth of 1½ kilocycles. The output of the 455-kilocycle amplifier 38 is applied to an automatic-gain-control circuit 40 and also to a band-pass limiter 42. The automatic-gain-control circuit, as is well known, varies the gain of the intermediate-frequency amplifier in order to avoid the effects of varying carrier signal strength.

The band-pass limiter 42 also has a 1½ kilocycle bandwidth and establishes the amplitude of the carrier at a desired predetermined value. The output of the band-pass limiter 42 is applied to a phase detector 44.

The other input to the phase detector comes from the phase-locked loop. This includes the voltage-controlled oscillator 46, which has a center frequency of one megacycle. The input to the voltage-controlled oscillator, as previously, is the output of the phase detector 44, which is applied through a low-pass filter 48. The voltage-controlled oscillator output is applied to a frequency multiplier 50. The frequency to which the output of the voltage-controlled oscillator should be multiplied should preferably be that of the incoming carrier received by the antenna 30. This is required in order that the output of a mixer 52, to which both the outputs from the crystal oscillator and the frequency multiplier are applied should provide a difference signal having a frequency of 455 kilocycles.

If the frequency of the incoming carrier is designated as $f_o$, the frequency of the crystal oscillator is designated as $f_1$, and the frequency of the output of the frequency multiplier is designated as $f_v$, then there is shown in FIGURE 2 a frequency table indicating turning required for the radio-frequency amplifier 32 and crystal oscillator 36, and also the settings required for the frequency multiplier in order to receive the various carrier signals transmitted by WWV. It will be noted, however, that in each one of these the output from the voltage-controlled oscillator will always be one megacycle. The output from the frequency multiplier will also be a reference standard frequency having the value of the incoming carrier.

The output of the mixer 52 is applied to a 455 kilocycle intermediate amplifier 54. The output of this amplifier 54 is then applied to a band-pass limiter 56, which sets the amplitude of the signals received to the same value as that of the band-pass limiter 42. As a result, the phase detector 44 provides an output voltage representative of the phase difference between the carrier signal which has been heterodyned to 455 kilocycles and the voltage-controlled oscillator output which also has been heterodyned to 455 kilocycles. The voltage-controlled oscillator will have its frequency adjusted by the phase detector output until the output of the phase detector has a minimal value. In view of the use of the single crystal oscillator for heterodyning both the received carrier as well as the output of the voltage-controlled oscillator, any variation in frequency of the crystal oscillator will automatically be canceled, since both 455 kilocycle signals being compared are affected identically.

There has accordingly been described and shown above novel and useful receiver circuits for receiving reference carrier signals and providing an output which is locked in phase and frequency to such reference carrier. The receivers are less expensive to construct than those made heretofore and yet have performance characteristics which are equal to or exceed the best and most expensive receivers presently available for the purpose. The individual circuits employed in the receivers are well-known to those technicians in the receiving art.

We claim:

1. A receiver for providing a reference frequency from radio frequency carrier signal comprising means for receiving said radio frequency carrier signal, a voltage-controlled oscillator, means for mixing output from said voltage-controlled oscillator with output from said means for receiving said radio frequency carrier to obtain an intermediate frequency, means for comparing said intermediate frequency with said voltage-controlled oscillator output to derive a control voltage representing any deviation between the two, and means to apply said control voltage to said voltage-controlled oscillator to shift the frequency of the output of said voltage-controlled oscillator in a direction to minimize said control voltage whereby the voltage-controlled oscillator output provides a reference frequency.

2. A receiver for providing a reference frequency from a radio frequency carrier signal as recited in claim 1 wherein said means for mixing output from said voltage-controlled oscillator with output from said means for receiving said radio frequency carrier includes means for multiplying the frequency of the output of said voltage-controlled oscillator by a predetermined factor, and a mixer amplifier to which output from said means for multiplying and from said means for receiving said radio frequency carrier are applied.

3. A receiver for providing a reference frequency from a radio frequency carrier signal comprising means for receiving said reference frequency carrier signal, a voltage-controlled oscillator, means for multiplying the frequency of the output of said voltage-controlled oscillator, means for mixing the output of said means for receiving with the output of said means for multiplying, means for deriving desired intermediate frequency signals from the output of said means for mixing, means for comparing said desired intermediate frequency signals with output from said voltage-controlled oscillator including means to obtain a control voltage representative of a difference between said intermediate frequency signals and said voltage-controlled oscillator output, and means to apply said control voltage to said voltage-controlled oscillator to minimize said control voltage whereby the voltage-controlled oscillator output provides a reference frequency.

4. A receiver for providing a reference frequency from a radio frequency carrier signal comprising means for receiving said reference frequency carrier signal, a voltage-controlled oscillator, means for multiplying the frequency of the output of said voltage-controlled oscillator, means for mixing the output of said means for receiving with the output of said means for multiplying, means for deriving desired intermediate frequency signals from the output of said means for mixing, a phase comparator, means for applying said desired intermediate frequency to said phase comparator, means for applying output from said voltage-controlled oscillator to said phase comparator, a low-pass filter connected between said phase comparator output and said voltage-controlled oscillator input, a quadrature phase comparator, means for applying said desired intermediate frequency to said quadrature phase comparator and means for applying output from said voltage-controlled oscillator to said quadrature phase comparator to provide as an output any modulation of said reference frequency carrier signals.

5. A receiver for providing a reference frequency from radio frequency carrier signals comprising means for receiving said radio frequency carrier signals, means for converting the output of said means for receiving to first signals having a desired frequency, a voltage-controlled oscillator, means for converting the output of said voltage-controlled oscillator to second signals having said desired frequency, means for comparing the phases of said first and second signals to provide a control voltage representative of the difference, and means for applying said control voltage to said voltage-controlled oscillator in a manner to minimize said control voltage whereby the output of said voltage-controlled oscillator provides a reference frequency.

6. A receiver for providing a reference frequency from radio frequency signals comprising means for receiving said radio frequency signals, a first mixer, an oscillator, means for applying output from said means for receiving and said oscillator to said first mixer, first means for deriving signals having a desired frequency from said first mixer, a voltage-controlled oscillator, a second mixer, means for applying output from said oscillator and said voltage controlled oscillator to said second mixer, second means for deriving second signals having said desired frequency from said second mixer output, means for comparing the phase of said first and second signals to obtain a control voltage representative of any difference, and means for applying said control voltage to said voltage-controlled oscillator in a manner to minimize said control voltage whereby the output of said voltage-controlled oscillator provides a reference frequency.

7. A receiver for providing a reference frequency from radio frequency signals comprising means for receiving said radio frequency signals, an oscillator, a first mixer, means for applying output from said means for receiving and said oscillator to said first mixer, a first intermediate frequency amplifier connected to receive output from said mixer, a voltage-controlled oscillator, a second mixer, means for applying output from said oscillator and said voltage-controlled oscillator to said second mixer, a second intermediate frequency amplifier connected to receive output from said second mixer, a phase detector, first and second band pass limiters respectively connecting output from said first and second intermediate frequency amplifiers to said phase detector whereby said phase detector provides a control voltage output representative of the phase difference of the inputs, and means including a low-pass filter to apply said control voltage to said voltage-controlled oscillator to minimize said control voltage whereby the voltage-controlled oscillator output provides a reference frequency.

References Cited in the file of this patent

UNITED STATES PATENTS

| | | |
|---|---|---|
| 2,245,717 | Roberts | June 17, 1941 |
| 2,666,847 | Alter | Jan. 19, 1954 |
| 2,704,329 | Law | Mar. 15, 1955 |
| 2,891,245 | Coogan et al. | June 16, 1959 |